United States Patent Office 3,606,782
Patented Sept. 21, 1971

3,606,782
GEAR ROLLING METHOD AND APPARATUS
Warren C. McNabb, Detroit, and David W. Daniel, Birmingham, Mich., assignors to Lear Siegler, Inc., Santa Monica, Calif.
Filed Dec. 8, 1969, Ser. No. 883,037
Int. Cl. B21h 5/02
U.S. Cl. 72—108                    15 Claims

ABSTRACT OF THE DISCLOSURE

Gear rolling employing a gear-like die designed to operate with a work gear such that the operating pitch diameter lies outside or substantially outside the involute profile of the gear teeth, either radially outwardly beyond the involute profile or radially inwardly thereof.

SUMMARY OF THE INVENTION

In finish gear rolling operations a work gear is produced, usually by cutting but possibly by other types of operation such as rolling, to be slightly oversize with respect to the final desired dimensions of the gear. The gear is then rolled in tight mesh under pressure conditions with one or a plurality of gear-like dies, these dies being conjugate to the required gear tooth form. The operation is usually carried out so as to displace no more than a few thousandths of an inch of material on the surfaces of the gear teeth.

The operation desirably is carried out with rotation of the die or dies and gear limited to a single direction. This not only speeds up the production of gears but avoids the necessity for the special equipment required where reversal of rotating structure of substantial weight is repeatedly required.

Two independent factors determine the nature of the contact between engaging surfaces of involute gear teeth. In the first place it is recognized that the contact between involute teeth of a pair of meshing gears takes place along a line of contact tangent to the base circles of the two gears. At the same time, relative slipping or rubbing takes place between the engaged zones of contact of meshing gear teeth which is determined by the instantaneous direction of movement of the engaged tooth portions. At the zone determined by the line passing through the centers of the meshing gears, the engaged surfaces are both moving in the same direction so that instantaneously no sliding action occurs. On the other hand, during the arc of approach to this point the teeth of the gears are moving towards each other so that the direction of sliding contact on each is toward the root thereof. Similarly, during the arc of recession the engaged teeth are moving apart and accordingly, the direction of sliding movement on each is toward the crest thereof.

Accordingly, the direction of sliding contact reverses at the pitch line and the amount of sliding decreases from a maximum at initial contact to zero as the zone of contact crosses the line of centers and then increases again to a maximum as the teeth move out of contact.

In gear rolling this specific tooth contact tends to produce undesirable results since at one side of the teeth sliding contact is always toward the pitch line which tends to result in piling up of material at and adjacent the pitch line. At the opposite side of the teeth the sliding action is away from the pitch line tending to produce a hollow at the pitch line and to produce a piling up of material adjacent both the roots and the crests of the teeth.

In accordance with the present invention the die or dies is so designed with respect to the specific gear dimensions of the finished gear so during the rolling operation the operating pitch line is outside the involute profile of the gear teeth, either located radially outwardly therebeyond or radially inwardly thereof.

DETAILED DESCRIPTION

Figure 1:
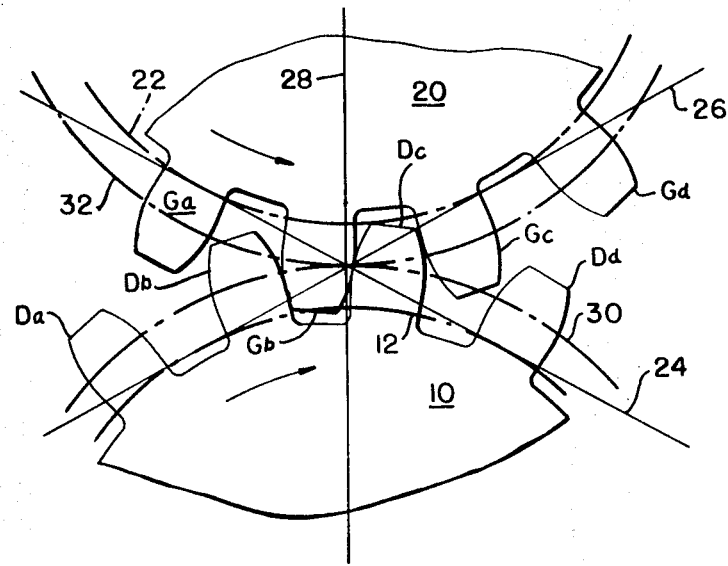
FIG. 1 is a diagrammatic view showing a few teeth of involute gears in tight mesh.

Reference is first made to FIG. 1 for a description of the nature of the rolling contact which takes place between the teeth of a die and gear. In this figure the die is indicated at 10 having teeth designated $Da$, $Db$, $Dc$, $Dd$, of generally involute configuration, these teeth being involutes of a base circle indicated at 12. The die is illustrated as in tight mesh with a work gear indicated generally at 20 having a succession of teeth designated $Ga$, $Gb$, $Gc$, $Gd$. These teeth are also involute teeth of a base circle indicated at 22. The gear and die are in tight mesh as illustrated, and lines of contact 24 and 26 are drawn tangent to the base circles.

The line joining the centers of the die 10 and work gear 20 is indicated at 28 and the intersection of this line with the lines of contact 24 and 26 determines the location of the operating pitch circles 30 and 32. Assume that the gear and die are rotating in the direction of the arrows, then it will be apparent that the gear teeth $Ga$ and $Gb$ are moving in the arc of approach or have a downward component as viewed in the figure. The gear teeth $Gc$ and $Gd$ are in the arc of recession and hence, have upward components of movement. Similarly, the die teeth $Da$ and $Db$ are moving in the arc of approach and hence, have an upward component of motion, whereas the die teeth $Dc$ and $Dd$ are moving in the arc of recession and have downward components of motion. The zone of contact between the gear tooth $Gb$ and the die tooth $Dc$ is, it will be noted, very close to the line of centers 28 where the operating pitch circles of the gear and die are tangent. At this point it will be observed that the engaged tooth portions at the right of the gear tooth $Gb$ and at the left of the die tooth $Dc$ are both moving substantially horizontally and accordingly, at this zone there is no appreciable relative sliding between the tooth surfaces.

It will also be observed that along the line of contact 24 the leading side of the tooth $Gb$ has moved from a position in which a portion adjacent its root had contacted a portion of the die tooth $Dc$ adjacent its tip and as rotation continues the zone on the surface of the leading side of the tooth $Gb$ contacted by the trailing side of the die tooth $Dc$ moves from a mid-point on the tooth at its pitch diameter toward its tip. At the same time of course, the zone on the trailing side of the die tooth $Dc$, which is in contact with the leading side of the tooth $Gb$, moves from a point adjacent its tip through the pitch line to a zone adjacent its root. Similar contact of course occurs along the line of contact 26 where the leading side of the die tooth $Db$ is illustrated as having a point adjacent its root in contact with the trailing side of the gear tooth $Gb$ adjacent its tip.

With this usual relationship between a pair of meshing gear-like members, the operating pitch lines of each are usually tangent intermediate the root and crest thereof, and in many cases, substantially midway therebetween. With this relationship however, it will be apparent that the trailing side of the gear tooth $Gb$ is engaged by the leading side of the die tooth $Db$ such that sliding contact which originates near the crest of the gear tooth G*b* and extending towards its root continues until the contacted portion reaches the zone of tangency of the operating pitch circles. At this time the direction of sliding contact reverses while the zone of contact continues to travel toward the root of the tooth. Thus, the trailing side of the gear teeth is subjected to a sliding action by the teeth of the rolling die which is always effective in a direction toward the operating pitch diameter thereof.

Similarly, the leading side of the gear teeth, where the contact is determined by the line of contact 24, initiates adjacent its root and terminates adjacent its crest, the direction of specific sliding always being in a direction away from the operating pitch diameter and toward either the root or the crest of the teeth.

This specific sliding action which exists between the teeth of a gear-like rolling die and the teeth of a work gear in tight mesh therewith tends to produce tooth surfaces on the gear which are not of satisfactory profile form. It is of course possible to compensate for observed discrepancies in gear teeth by making the appropriate modification of the die teeth.

However, in accordance with the present invention the teeth of a die designed for a finish rolling operation on the teeth of a particular gear are so related to it that the operating pitch diameter on the work gear is disposed entirely outside the annular zone traced by the involute profile. This may be accomplished by so designing the teeth of the die that the operating pitch diameter of the work gear when in tight mesh with the die, lies radially outwardly beyond the crests of the teeth or at least the radially outer portion of the involute profile. Alternatively, the die may be so designed that the operating diameter of the work gear when in tight mesh therewith, lies radially inwardly of the start of involute profile adjacent the roots of the teeth.

With this arrangement the direction of sliding which at one side of the gear tooth is always toward the operating pitch line and which at the other side is always away from the operating pitch line, will be in the same direction throughout the entire profile at one side of the teeth. This avoids the difficulties attributable to reversing the direction of specific sliding as the zone of contact travels from top to bottom or bottom to top of the gear teeth.

Figure 2:
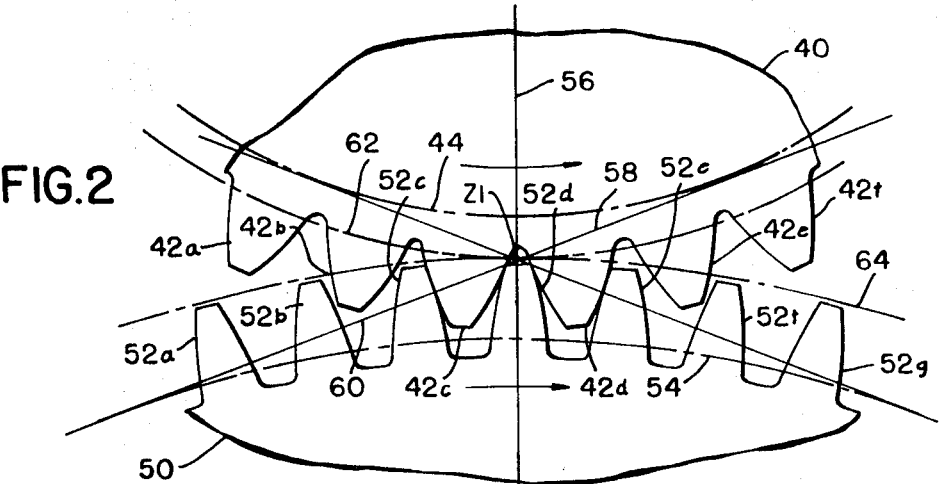
FIG. 2 is a diagrammatic view showing a portion of a tightly meshed work gear and rolling die constructed in accordance with the present invention.

Referring now to FIG. 2, the work gear 40 has a series of teeth designated 42*a*, 42*b*, 42*c*, 42*d*, 42*e*, 42*f*, these teeth being involutes from a base circle 44. The die 50 has a series of teeth 52*a*, 52*b*, 52*c*, 52*d*, 52*e*, 52*f*, 52*g* which are all involutes from a base circle 54. The gear 40 and die 50 are in tight mesh and the line joining the centers of the gear and die is indicated at 56. The die 50 is so designed that when in tight mesh the lines of contact between the teeth of the gear and die, which are tangent to the base circles, are designated at 58 and 60. These lines of contact intersect each other and the line of centers 56 at a zone Z1, establishing 62 as the operating pitch circle for the work gear, and 64 as the operating pitch circle of the die. It will be observed that the operating pitch circle 62 of the work gear lies radially inwardly beyond the active involute profile of the teeth of the work gear. Accordingly, as the gear 44 rolls in tight mesh with the die 50 and while a relative radial infeed between the gear and die occurs, the direction of specific sliding contact on the trailing side of the teeth occurs only in the arc of approach and the specific sliding contact is at this time always in the direction from the crests toward the roots of the teeth. Similarly, the contact between the teeth of the gear and the die at the leading side of the gear teeth, which takes place along the line of action 60, can take place only during the arc of recession, and the specific relative sliding between the leading side of the teeth of the gear and the die teeth is thus always in a direction from the roots toward the crests thereof.

This avoids the difficulties attributable to either piling up or removing excess material from the surfaces of the teeth adjacent the nominal pitch diameter.

It will of course be appreciated that the operating conditions established by this particular design of die are solely for the purpose of controlling tooth form on the gear. The gear when it has been finish rolled, will have conventional gear characteristics and is adapted to mesh with a cooperating work gear with the operating pitch diameter adjacent the middle of the gear teeth.

Figure 3:
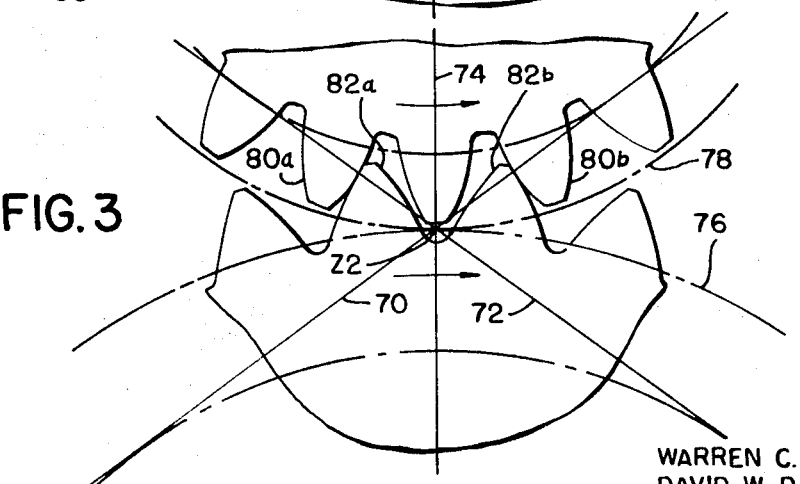
FIG. 3 is a view similar to FIG. 2, showing a die of different design.

Referring now to FIG. 3 there is illustrated a similar arrangement except that the die is designed with reference to the required gear characteristics so that the lines of action 70 and 72 intersect the line of centers 74 at a zone Z2 to establish the location of the operating pitch diameters 76 and 78. It will be observed that the operating pitch diameter 78 of the work gear lies radially outwardly beyond the crests of its teeth. Accordingly, with rotation as indicated by the arrows, the leading side of the gear tooth 80*a*, which tooth is moving in the arc of approach, has specific contact with the trailing side of the mating die tooth 82*a* only in a direction from the crest toward the rooth thereof even though the instantaneous zone of contact between the teeth 80*a* and 82*a* migrates from adjacent the root toward the crest thereof. It will be appreciated that as a gear tooth reaches the position designated 80*b* it is moving in the arc of recession and its trailing side is contacted by the leading side of a mating tooth 82*b* on the rolling die. The instantaneous zone of contact between the tooth 80*b* and the tooth 82*b* lies along the line of action 70 and is migrating along the trailing side of the tooth 80*b* toward the root thereof. However, since the teeth 80*b* and 82*b* are moving in the arcs of recession, the specific leading action between these teeth on the trailing surface of the tooth 80*b* is toward the crest of the gear tooth 80*b*.

We claim:

1. The method of finish rolling a work gear having slightly oversize generally involute gear teeth which comprises rolling the gear in timed relation to a gear-rolling die having a succession of generally involute teeth substantially conjugate to the finished involute teeth which it is desired to produce on the gear, establishing pressure between the die and gear radially of the gear to cause the teeth of the die to displace material from the teeth of the gear, the die being designed for use with a gear of known dimensions to cause the operating pitch diameter of the gear during the finish rolling operation to lie outside the involute profile of the gear teeth, and continuing the operation to reduce the size of the gear teeth to the required dimensions.

2. The method as defined in claim 1 in which the operating pitch diameter of the gear during the rolling operation lies radially outwardly beyond the involute profile of the gear teeth.

3. The method as defined in claim 1 in which the operating pitch diameter of the gear during the rolling operation lies radially inwardly of the involute profile of the gear teeth.

4. The method as defined in claim 1 in which the die is in the form of a cylindrical gear.

5. The method as defined in claim 4 in which the die teeth are identical around the die.

6. The method as defined in claim 5 in which the radial pressure is established by relatively moving the die and gear toward each other radially of the gear during rotation thereof.

7. The method as defined in claim 1 which comprises providing a pair of dies at opposite sides of the gear.

8. The method as defined in claim 6 which comprises providing a pair of dies at opposite sides of the gear.

9. The method as defined in claim 1 in which both the die and work gear are cylindrical.

10. A die for finish rolling a work gear having slightly oversize generally involute teeth,
said die comprising a body having a series of substantially involute teeth generally conjugate to the finished involute teeth which it is desired to produce on the gear,
said die being designed to engage in tight mesh with the work gear during rotation of the gear with the operating pitch diameter of the gear to lie outside the involute profile of the gear teeth.

11. A die as defined in claim 10 in which the operating pitch diameter of the gear lies radially outwardly beyond the involute profile of the gear teeth.

12. A die as defined in claim 10 in which the operating pitch diameter of the gear lies radially inwardly of the involute profile of the gear teeth.

13. A die as defined in claim 10, said die being in the form of a rotatable gear.

14. A die as defined in claim 10, said die being in the form of a cylindrical gear.

15. A die as defined in claim 14 in which the die teeth are identical around the die.

References Cited
UNITED STATES PATENTS 1,642,179   9/1927   Schurr     29—159.2

LOWELL A. LARSON, Primary Examiner

U.S. Cl. X.R.

29—159.2; 72—102